Patented Apr. 21, 1925.

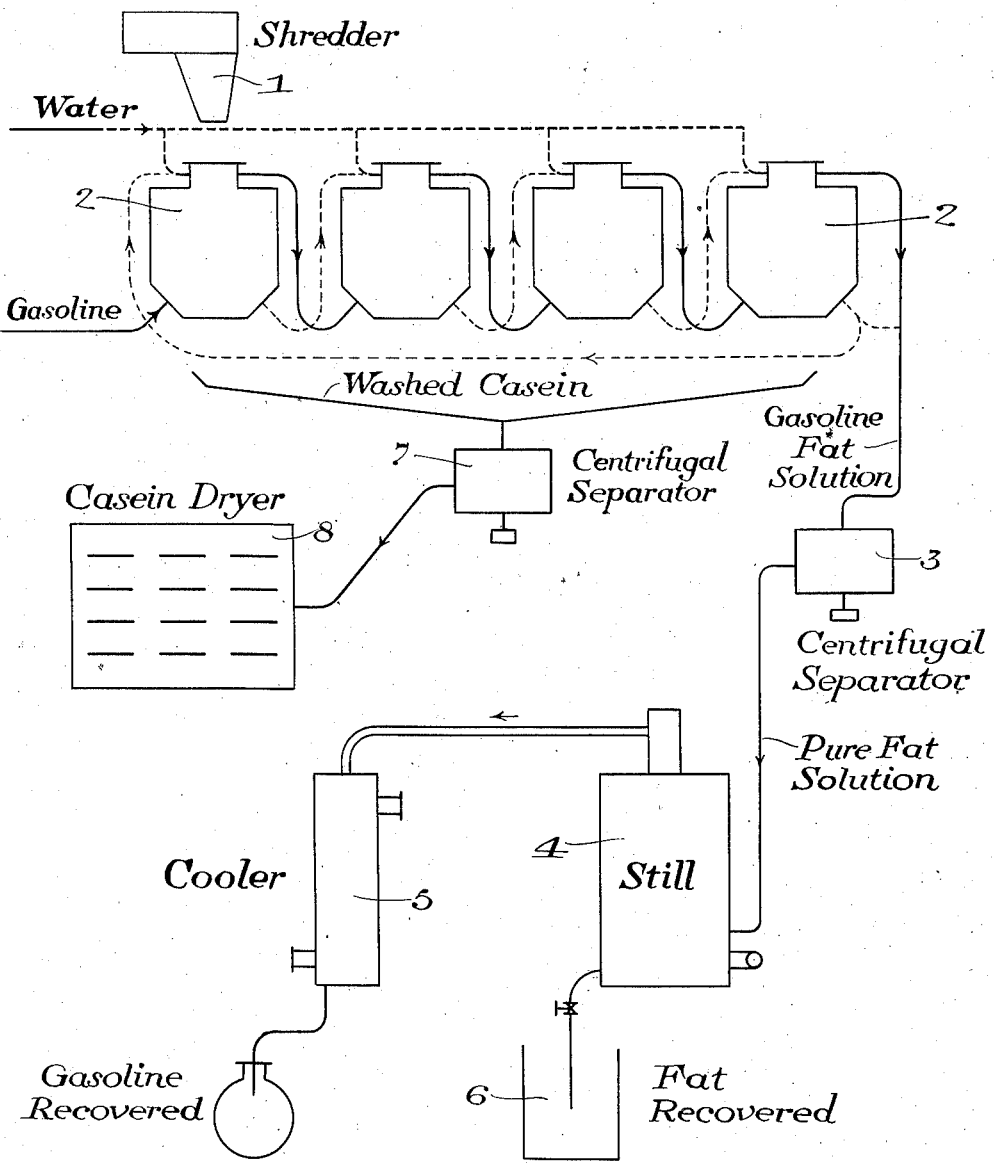

1,534,400

UNITED STATES PATENT OFFICE.

EDMUND KUREK AND RUDOLPH E. POSPISIL, OF CHIPPEWA FALLS, WISCONSIN.

PROCESS FOR RECOVERING FAT AND CASEIN FROM CHEESE.

Application filed July 18, 1923. Serial No. 652,357.

*To all whom it may concern:*

Be it known that we, EDMUND KUREK and RUDOLPH E. POSPISIL, citizens of the United States, and residents of Chippewa Falls, in the county of Chippewa and State of Wisconsin, have invented new and useful Improvements in Processes for Recovering Fat and Casein from Cheese, of which the following is a description, reference being had to the accompanying drawings, which are a part of this specification.

The invention relates to a process for recovering fat and casein from cheese, and more particularly waste cheese.

The object of the invention is to provide a simple but effective process for recovering fat and casein from waste cheese in the manner hereinafter described and claimed.

The drawing is a diagrammatic representation of various steps of the process.

The cheese material is preferably introduced into a shredder 1 to render it fine and thereby facilitate the action of the fat-dissolving agent.

The shredded cheese material is then charged into extractors 2 where it is acted upon by a fat-dissolving agent of any suitable kind, but preferably a volatile agent, the agent here named being gasoline. With a battery of extractors 2, as shown, the gasoline may be first introduced into the bottom of each extractor and leave at the top, as shown by the full lines, and during the extraction the run of the liquid can be reversed by introducing it at the top and taking it off at the bottom, according to the behavior of the material as to its tendency to float or settle.

The action of the gasoline upon the cheese material in the extractor cells is to dissolve the fat and when the extraction is completed the gasoline fat solution is conducted to a centrifugal separator 3, preferably of the De Laval type, to separate the finely suspended cheese film from the fat solution.

The pure fat solution is then taken from the separator 3 to a still 4 where on the application of heat, such as the indirect heating by steam, it is boiled, and the gasoline or other suitable volatile fat-dissolving agent is distilled over to a cooler 5 and recovered while the fat remains in the still and can be withdrawn to a receptacle 6.

After the extraction of the fat the casein which remains in the extractor cells is washed with warm water, the water entering the cells at the top, as shown by the heavy broken lines.

The whole content of water and casein from the cells is then taken into a centrifugal separator 7 where the water is removed and the casein is then taken from the separator to a dryer 8.

Thus, both the casein and fat are recovered from the cheese material and the fat-dissolving agent is recovered for reuse in the process.

We have used the term "gasoline" in this specification to designate any suitable dissolving agent.

What we claim as our invention is:

1. The process of recovering fat and casein from waste cheese material which consists in placing cheese in a finely divided condition in an extractor and treating it with a fat-dissolving agent, centrifugalizing the fat solution obtained from the extractor to produce a pure fat solution and separating the dissolving agent from the fat, washing the residue in the extractor with water and centrifugalizing this washed residue to remove the casein therefrom.

2. The process of recovering fat and casein from waste cheese material, which consists of placing cheese in a finely divided condition in a battery of extractors and passing a fat-dissolving agent serially through said extractors, centrifugalizing the fat solution obtained from the extractors to obtain a pure fat solution and separating the dissolving agent from the fat, washing the residue in the extractors with warm water and centrifugalizing this washed residue to remove the casein therefrom.

In testimony whereof, we affix our signatures.

EDMUND KUREK.
RUDOLPH E. POSPISIL.